Sept. 25, 1923.   H. D. SUMMERS   1,468,761
BRIDGE GAUGE
Filed Jan. 13, 1922
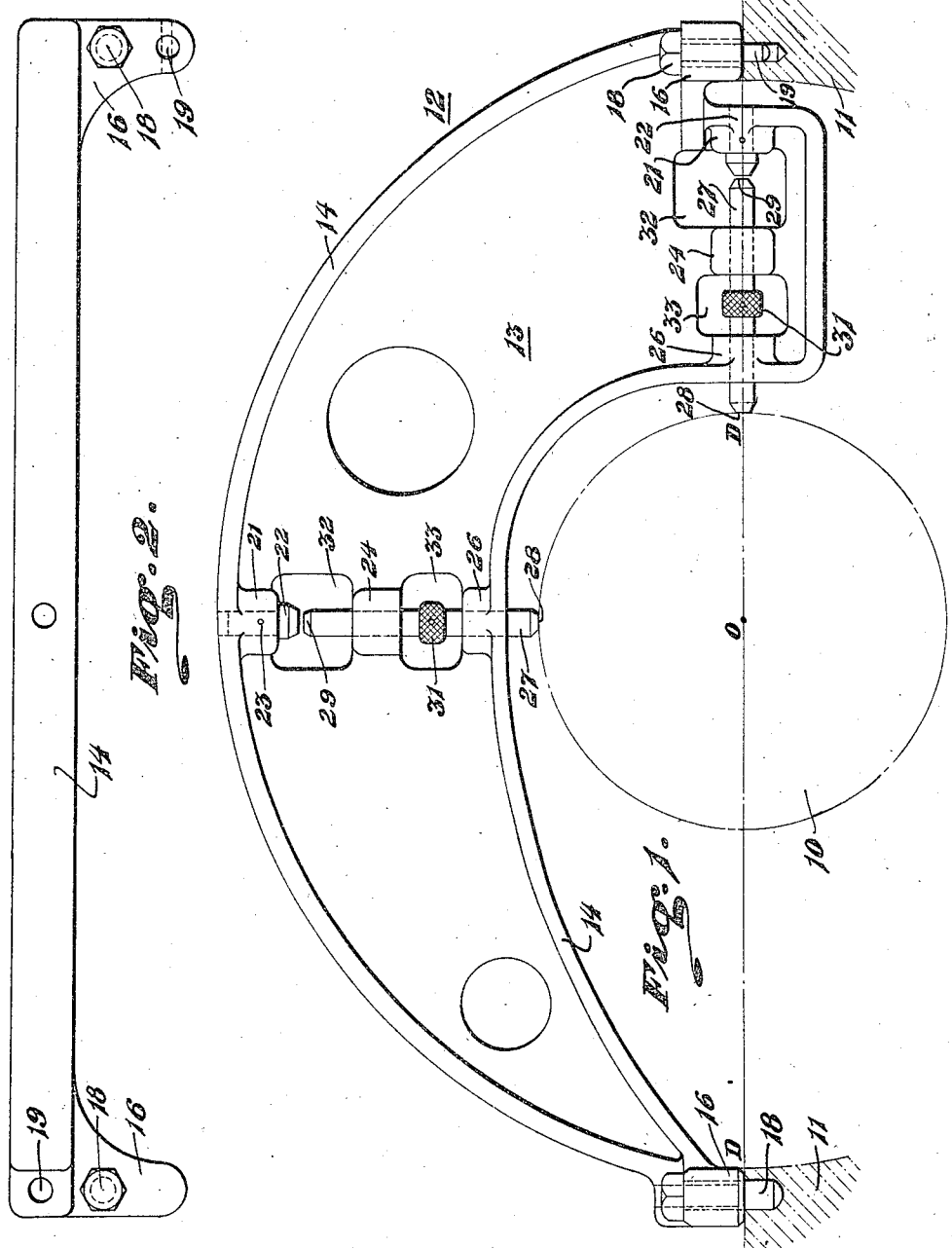
WITNESSES
H. D. Summers
INVENTOR
BY D. C. Davis
ATTORNEY Patented Sept. 25, 1923.

1,468,761

UNITED STATES PATENT OFFICE.

HARRY D. SUMMERS, OF ESSINGTON, PENNSYLVANIA, ASSIGNOR TO WESTINGHOUSE ELECTRIC & MANUFACTURING COMPANY, A CORPORATION OF PENNSYLVANIA.

BRIDGE GAUGE.

Application filed January 13, 1922. Serial No. 529,012.

*To all whom it may concern:*

Be it known that I, HARRY D. SUMMERS, a citizen of the United States, and a resident of Essington, in the county of Delaware and State of Pennsylvania, have invented a new and useful Improvement in Bridge Gauges, of which the following is a specification.

My invention relates to bridge gauges, and more particularly to bridge gauges for the journals of large machines such as turbines and generators, and it has for an object the provision of apparatus of the character designated which shall permit the gauging of such journals quickly and easily, and with a high degree of accuracy.

In the accompanying drawing, Fig. 1 is a side elevation of a bridge gauge embodying my invention, and Fig. 2 is a plan view thereof.

In the use of bearing and journal gauges, a high degree of accuracy is necessary, involving measurements to within a few thousandths of an inch; thickness gauges of the well known feeler type being generally used. In bridge gauges for this purpose as hitherto constructed and known to me, the bridge member of the gauge carries fixed abutments or reference points between which and the journal feeler gauges of various thickness are inserted until the distance is determined. This procedure involves considerable difficulty because of the small space into which the workman must insert his hand in order to use the feeler gauge and the difficulty of maintaining the gauge in a proper position with respect to the line of measurement. It frequently happens that after the expenditure of time results of only questionable accuracy are obtained, because of the cramped position necessary to effect a measurement by this method.

With the above and other objects in view, I have devised a bridge gauge by means of which the measurement to be effected is transposed to a position in which it can be readily and accurately taken. Still other structural features of my invention will be apparent from the subjoined description.

Referring to Fig. 1 of the drawing for a detailed understanding of my invention, I show at 10 a journal which it is desired to gauge and at 11 a housing for the bearing in which the journal is mounted. A beam member 12, of a general arcuate form, is adapted to span the journal 10 and to be supported at its ends on the housing 11. As shown, the beam member consists of a web 13 and flanges 14, but any structure possessing sufficient rigidity may be employed. The ends of the beam member 12 are provided with feet 16, adapted to rest on the surface 17 of the housing 11 and are further provided with screws 18 by means of which the beam member 12 is rigidly secured in fixed relation to the bearing of the journal 10, in a manner well understood in the art to which my invention relates. The feet 16 are also provided with dowels 19, by means of which accurate positioning of the beam member 12 is secured.

The web 13 of the beam member 12 is provided at points near its outer flange 14 with bosses 21, drilled for the reception of studs 22, constituting abutments fixed with respect to the beam member 12. The abutments 22 may be secured in the bosses 21 in any well known manner, as by rivets 23. The axes of the fixed abutments are determined by straight lines intersecting at right angles at the center of the journal 10, which center constitutes a datum point 0. One of these axes is preferably coincident with the horizontal diameter DD of the journal 10, which line DD constitutes the datum line of a system of rectangular co-ordinates, the origin of which is the point 0.

The web 13 of the beam member 12 is also provided with bosses 24 and 26, drilled for the reception of pins 27, which are slidably mounted therein. The pins 27 are in axial alinement with the abutments 22 and constitute feeler pins adapted to move into contact with the journal 10 at their inner ends 28. The outer ends 29 of the feeler pins 27 are adapted to contact with the inner ends of the abutment 22. The feeler pins 27 are provided with enlarged, knurled portions 31 which constitute stops, playing between the bosses 24 and 26, to limit axial travel of the pins 27, and which also serve to facilitate manual movement of the pins 27. The web 13 is cut away at certain portions adjacent the feeler pins 27, as indicated at 32 and 33, to provide spaces for the convenient operation of the pins 27.

In the operation of my device, the beam member 12 is placed in position across the journal or other part to be gauged, the feet 16 resting on the surface 17 of the split housing 11, and secured thereto by the screws 18 and the dowels 19. Each of the feeler pins 27 is then manually advanced into contact with the journal 10, by means of its knurled enlargement 31. In this manner the position of the journal 10 with reference to the datum point 0 is transferred to the outer ends 29 of the feeler pins 27, where it can be easily and accurately determined by a measurement of the distances between the pin ends 29 and the abutments 22. This is readily accomplished by an ordinary feeler gauge 35.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. A bridge gauge for journals comprising a beam member adapted to be fixed with respect to a datum point, movable feeler pins carried by the beam member and adapted to be moved into engagement with the journal, and means associated with the feeler pins whereby the position of said journal with respect to the datum point may be measured at points not contiguous to the journal.

2. A bridge gauge comprising a beam member adapted to be supported in fixed relation to coordinate datum axes, and means including feeler pins carried by the beam member for determining the position of the object to be gauged with relation to said axes at points removed from said object.

3. A bridge gauge for journals comprising a beam member adapted to be supported on the journal housing, movable feeler pins so carried by the beam member that their axes intersect at right angles at a datum point, and fixed abutments carried by the beam member and axially alined with the feeler pins respectively, whereby by the insertion of thickness gauges between the pins and the abutments, the former may determine the position of the journal axis with respect to the datum point.

4. A bridge gauge for journals comprising a beam member adapted to be supported in fixed relation to the journal support, fixed abutments carried by the beam member, and movable feeler pins axially alined with said abutments respectively, and adapted to engage the journal, and provided with stops to limit the movement thereof, whereby the measurement of the distance between each feeler pin and its associated abutment determines the position of the journal with respect to its support.

5. A bridge gauge comprising an arcuate beam member adapted to span a journal bearing, means associated with the beam member for supporting it in fixed relation to said bearing, axially movable feeler pins supported in the bridge member, fixed abutments associated with the bridge member coaxial with the feeler pins and adapted to coact therewith, means whereby the feeler pins may be moved into contact with the journal, whereby the measurement of the distances between the coacting ends of the feeler pins and the fixed abutments determines the position of the journal with respect to its support.

In testimony whereof, I have hereunto subscribed my name this 9th day of January, 1922.

HARRY D. SUMMERS.